United States Patent
Pasini et al.

(10) Patent No.: US 9,800,512 B2
(45) Date of Patent: Oct. 24, 2017

(54) METHOD AND SYSTEM FOR PRIORITISING TRAFFIC FLOWS

(75) Inventors: Federico Pasini, Cogoleto (IT); Maurizio Pighetti, Genoa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 52 days.

(21) Appl. No.: 14/418,928

(22) PCT Filed: Aug. 28, 2012

(86) PCT No.: PCT/EP2012/066652
§ 371 (c)(1),
(2), (4) Date: Jan. 30, 2015

(87) PCT Pub. No.: WO2014/019633
PCT Pub. Date: Feb. 6, 2014

(65) Prior Publication Data
US 2015/0304228 A1    Oct. 22, 2015

(30) Foreign Application Priority Data

Aug. 1, 2012  (EP) .................................. 12178799

(51) Int. Cl.
*H04L 12/28*    (2006.01)
*H04L 12/863*   (2013.01)
(Continued)

(52) U.S. Cl.
CPC ...... *H04L 47/6215* (2013.01); *H04L 41/0816* (2013.01); *H04L 47/2475* (2013.01)

(58) Field of Classification Search
CPC ............ H04L 2012/5679; H04L 47/50; H04L 47/805; H04L 47/625
See application file for complete search history.

(56) References Cited

U.S. PATENT DOCUMENTS 6,483,805 B1 * 11/2002 Davies ................. H04L 41/142
370/235
7,283,468 B1 * 10/2007 Hill ....................... H04L 45/302
370/229

(Continued)

FOREIGN PATENT DOCUMENTS

| EP | 1311083 A2 | 5/2003 |
| EP | 1351441 A2 | 10/2003 |
| EP | 1517484 A1 | 3/2005 |

OTHER PUBLICATIONS

PCT International Search Report for PCT/EP2012/066652, dated Oct. 18, 2012, 3 pages.

(Continued)

*Primary Examiner* — Siren Wei
(74) *Attorney, Agent, or Firm* — Nicholson De Vos Webster & Elliott LLP

(57) ABSTRACT

A method for prioritizing traffic within the IP protocol of a data communications network, the method comprising detecting an activity belonging to a pre-defined group of high priority activities; identifying network elements associated with the high priority activity; and prioritizing traffic from the network elements associated with the high priority activity. Also disclosed is a management system arranged to implement the above-described method, and a data communications network comprising said management system.

21 Claims, 4 Drawing Sheets

(51) Int. Cl.
  *H04L 12/24* (2006.01)
  *H04L 12/859* (2013.01)

(56) References Cited

U.S. PATENT DOCUMENTS

| | | | |
|---|---|---|---|
| 8,584,128 B1* | 11/2013 | Don | G06F 9/5011 718/100 |
| 2002/0110084 A1 | 8/2002 | Butt et al. | |
| 2002/0188732 A1 | 12/2002 | Buckman et al. | |
| 2003/0107590 A1* | 6/2003 | Levillain | H04L 29/06027 715/736 |
| 2003/0179703 A1* | 9/2003 | Levy | H04L 41/06 370/230 |
| 2005/0215284 A1* | 9/2005 | Su | H04W 72/1215 455/556.2 |
| 2007/0121507 A1* | 5/2007 | Manzalini | H04L 47/10 370/235 |
| 2009/0323612 A1* | 12/2009 | Bultinck | H04W 28/24 370/329 |
| 2010/0228862 A1* | 9/2010 | Myers | H04L 65/105 709/227 |
| 2012/0026880 A1* | 2/2012 | Miller | H04W 4/22 370/235 |
| 2012/0215911 A1* | 8/2012 | Raleigh | H04L 12/14 709/224 |

OTHER PUBLICATIONS

Mahon, et al., Usage Cases for a Policy Management System, Internet Draft, draft-mahon-policy-use-00.txt, Nov. 9, 2000, 38 pages.
"Architecture and specification of data communication network", International Telecommunication Union, ITU-T Telecommunication Standardization Sector of ITU, G.7712/Y.1703, Sep. 2010, 96 pages.
Baker, F. et al., "Management Information Base for the Differentiated Services Architecture", May 2002, 116 pages, Network Working Group, Request for Comments: 3289, The Internet Society.
Heinanen, J. et al., "Assured Forwarding PHB Group", Jun. 1999, 11 pages, Network Working Group, Request for Comments: 2597, The Internet Society.
Nichols, K. et al., "Definition of the Differentiated Services Field (DS Field) in the IPv4 and IPv6 Headers", Dec. 1998, 18 pages, Network Working Group, Request for Comments: 2474, The Internet Society.
Written Opinion for Application No. PCT/EP2012/066652, dated Oct. 18, 2012, 7 pages.
International Preliminary Report on Patentability for Application No. PCT/EP2012/066652, dated Feb. 3, 2015, 9 pages.
"Series Q: Swtiching and Signalling Q3 interface; Lower layer protocol profiles for the Q and X interfaces", ITU-T Telecommunication Standardization Sector of ITU, Q.811, Feb. 2004, 46 pages.

* cited by examiner

METHOD AND SYSTEM FOR PRIORITISING TRAFFIC FLOWS

CROSS-REFERENCE TO RELATED APPLICATIONS

This application is a National stage of International Application No. PCT/EP2012/066652, filed Aug. 28, 2012, which claims priority to EP Application No. 12178799.8, filed Aug. 1, 2012, which are hereby incorporated by reference.

TECHNICAL FIELD

The present invention relates to a method system for prioritising traffic flows within an Internet Protocol Data Communication Network (IP DCN), and particularly but not exclusively a system for prioritising traffic from a Network Element (NE) based on its importance from a Network Management System (NMS) perspective.

BACKGROUND

As used herein, the term "local" includes the part of the Data Communication Network (DCN) hierarchically below the Gateway NEs, whilst the term "external" includes the part of the DCN hierarchically above the Gateway NEs.

As used herein, the term "management system" includes the Network Management System (NMS) and the Element Management System (EMS).

A typical Data Communication Network (DCN) consists of Network Elements (NEs) interconnected to an external DCN via an Ethernet Interface (Gateway NE), the NEs being at a lower hierarchical level than the Gateway NEs. The NEs may be connected via embedded channels inside the traffic lines such as Synchronous Transmission Module-n (STM-n) for Synchronous Digital Hierarchy (SDH) or optical channels for Dense Wavelength Divisional Multiplexing (DWDM). These embedded channels are called, depending from the kind of frame overhead they use, Data Communications Channels (DCCs), Optical Supervisory Channels (OSCs), General Communications Channels (GCCs), and others. To realise an end to end connection between the Operational Support System (OSS) applications and managed NEs, an out of band DCN component is additionally deployed as based on dedicated high performance routers interconnected by high-bandwidth links.

Those skilled on the art will appreciate that the Open System Interconnection (OSI) reference model divides communication within the DCN into seven layers. It should be noted, however, that the OSI Reference Model is simply a guideline and that actual protocol stacks may combine one or more of the OSI layers into a single layer. The present invention is primarily concerned with Layer 3 in the OSI classification, namely the Network Layer. This layer determines the way in which data is sent to the recipient device and includes logical protocols, routing and addressing.

In particular, the present invention concerns the Internet Protocol (IP), which is a Layer 3 protocol. It will be appreciated that the Layer 3 Protocol Data Unit (PDU) is known in the art as a "packet" or a "datagram", and may contain user data and/or control information such as address information. Within the IP protocol, each NE, Gateway NE etc is identified by a unique IP address. As used herein, the term "node" applies to any device with an IP address.

Each packet contains the IP address of the sender and intended recipient(s). The IP protocol transmits packets between intermediate nodes using IP routers, which determine the optimum path for transmission of the packet to the recipient.

In general, an IP DCN normally operates a dynamic routing protocol to find alternate routes whenever a link becomes unavailable. As part of dynamic routing, the packets are transmitted through the internetwork one hop at a time; each intermediate destination is calculated by matching the address of the intended recipient (as encoded within the packet) with the current node's routing table. As such, each node simply forwards a packet to its next destination and does not monitor whether the packet reaches its intended recipient. This is known as a "Best Effort" service since it does not provide full reliability.

To support specific business requirements, the Internet Engineering Task Force (IETF) acknowledged the need for a method of providing differentiated classes of service for Internet traffic. The Differentiated Services Working Group of the IETF defined the Differentiated Services (DiffServ or DS) model. DiffServ operates on the principle of traffic classification: each packet is assigned a 6-bit Differentiated Services Code Point (DSCP) field for packet classification purposes. The DSCP value of a packet determines the priority that is assigned to it as it is routed through the internetwork. It will be appreciated that it is generally desirable to prioritise management traffic over other IP traffic flowing through the DCN.

For local in-band communications of known DCNs, the NEs usually allocate dedicated routing resources to manage traffic flowing through the DCN channels. Accordingly, management traffic is not expected to compete with IP traffic related to other applications, and thus local IP management traffic is assigned a DSCP value corresponding to a basic priority. However, given the need to route an increasing volume of management traffic through the DCN channels, it is anticipated that the current situation will become problematic. In particular, it is anticipated that, due to the limited capacity of the dedicated routing resources, a relatively small increase in the total volume of traffic will force the management traffic to compete with IP traffic related to other applications.

When the management traffic reaches a Gateway NE, it passes from the local part of the DCN to the external part thereof. It will be appreciated that in this transition, the traffic passes from Layer 3 to Layer 2 within the OSI classification. During the transition from Layer 3 to Layer 2, the DSCP value of a Protocol Data Unit ("packet" in Layer 3) is mapped to a Class of Service (CoS) value using CoS translation tables configured on the Gateway NE. CoS operates at Layer 2 whilst DCSP operates at Layer 3, but both fields serve to indicate the level of priority is assigned to the Protocol Data Unit. It will be appreciated that the Gateway NE may assign management traffic a higher priority than traffic related to other applications during translation from DSCP to CoS.

As noted above, the present system is likely to become inadequate if the volume of management traffic were to increase. It is therefore desirable to prioritise management traffic against other routed traffic, and particularly for prioritising management traffic within the Internet Protocol, which operates in Layer 3.

SUMMARY

In accordance with the present invention as seen from a first aspect, there is provided a method for prioritising traffic within a Data Communications Network, the Data Communications Network comprising a management system and a plurality of network elements, the method being implemented within an IP protocol of the Data Communications Network and comprising the steps of:

detecting a high priority activity, said high priority activity being defined as an activity belonging to a pre-defined group of high priority activities;

identifying network elements associated with said high priority activity; and, prioritising traffic from said network elements associated with said high priority activity.

Said pre-defined group of high priority activities may comprise activities that are considered as high priority from a management system perspective. In particular, the management system may comprise a Network Management System and said pre-defined group of high priority activities may comprise activities that are considered as high priority from a Network Management System (NMS) perspective. Said group of high priority activities may be pre-programmed into the management system or may be configurable by a user.

It will be appreciated that a method in accordance with the present invention enables traffic associated with activities that are particularly important to the management system to be prioritised over traffic associated with other applications. It is envisaged that the high priority activities will include network management activities and element management activities such as performance collection, node backup and the like.

The step of detecting an activity belonging to said pre-defined group of high priority activities may comprise receiving a signal from the management system, said signal indicating that the management system is preparing to commence an activity belonging to said pre-defined group of high priority activities. Alternatively, or in addition thereto, the step of detecting an activity belonging to said pre-defined group of high priority activities may comprise monitoring the management system for an indication that it is undertaking an activity belonging to said pre-defined group of high priority activities and/or for an indication that it is preparing to commence an activity belonging to a pre-defined group of high priority activities.

The step of prioritising traffic from said network elements associated with said high priority activity may comprise assigning a high priority tag to packets transmitted therefrom, and in particular, may comprise assigning a Differentiated Services Code Point (DSCP) value corresponding to a high priority to packets transmitted from said network elements associated with said high priority activity.

The method may further comprise the steps of detecting when said high priority activity is completed and restoring default priority to traffic from said network elements associated with said high priority activity upon completion of said high priority activity.

Alternatively, or in addition thereto, the method may comprise the step of restoring default priority to traffic from said network elements associated with said high priority activity upon expiry of a pre-set time period. The pre-set time period may be pre-programmed into the management system or may be configurable by a user.

The method may further comprise the step of recording a default DSCP value for each network element associated with said high priority activity, said default DSCP value being defined as a DSCP value of said network element prior to detection of said high priority activity. In this embodiment, the step of restoring default priority to traffic from said network elements associated with said high priority activity (19) may comprise assigning said default DSCP value to packets transmitted from said network element.

The step of detecting an activity belonging to a pre-defined group of high priority activities may be performed by the management system. Similarly, the step of identifying network elements associated with said activity may be performed by the management system.

In accordance with the present invention, as seen from a second aspect, there is provided a management system for prioritising traffic within an IP protocol of a data communications network, the data communications network comprising network elements, the management system comprising:

a detector for detecting a high priority activity, said high priority activity being defined as an activity belonging to a pre-defined group of high priority activities;

an analyser for identifying network elements associated with said high priority activity; and, a traffic manager for prioritising traffic from said network elements associated with said high priority activity.

The detector may be arranged for detecting when the management system is preparing to commence an activity belonging to said pre-defined group of high priority activities. Alternatively or in addition thereto, the detector may be arranged for detecting when the management system is undertaking an activity belonging to said pre-defined group of high priority activities.

The pre-defined group of high priority activities may comprise activities that are implemented by the management system. These activities may include, but are not limited to, protection switching and node realignment. In particular, the pre-defined group of high priority activities may comprise certain activities that are implemented by the management system but not all activities that are implemented by the management system. In this way, only traffic associated with activities that are considered high priority from a management system perspective is priorities. For example, the pre-defined group of high priority activities may not include batch-based functions such as network element back-ups, performance collections and the like.

The management system may comprise a network management system and the pre-defined group of high priority activities may comprise activities that are considered as high priority from the perspective of the network management system.

The pre-defined group of high priority activities may be pre-programmed into the management system. Alternatively, the group of pre-defined high priority activities is configurable by a user.

The traffic manager may be arranged for assigning a high priority tag to packets transmitted from said network elements associated with said high priority activity. In particular, the traffic manager may be arranged for assigning a DSCP value corresponding to a high priority to packets transmitted from said network elements associated with said high priority activity.

The traffic manager may be arranged for restoring a default priority to traffic from said network elements associated with said high priority activity upon at least one of: completion of said high priority activity or expiry of a pre-set time period.

In particular, the detector may be arranged for detecting when said high priority activity is completed and the traffic manager may be arranged for restoring a default priority to traffic from said network elements associated with said high priority activity upon completion of said high priority activity. Alternatively, or in addition thereto, the traffic manager may be arranged for restoring the default priority to traffic from said network elements associated with said high priority activity upon expiry of said pre-set time period.

The traffic manager may be arranged for:
recording a default DSCP value for each network element associated with said high priority activity (19), said default DSCP value being defined as a DSCP value of said network element (19) prior to detection of said high priority activity; and,
assigning said default DSCP value to packets transmitted from said network element (19) upon at least one of: completion of said high priority activity or expiry of a pre-set time period.

The management system may be implemented on a single node.

Also in accordance with the present invention, as seen from the second aspect, there is provided a data communications network arranged for prioritising traffic within an IP protocol thereof, the data communications network comprising a network elements (11) and a management system as hereinbefore described.

BRIEF DESCRIPTION OF THE DRAWINGS

An embodiment of the present invention will now be described by way of example only and with reference to the accompanying drawings, in which.

DETAILED DESCRIPTION

Figure 1:
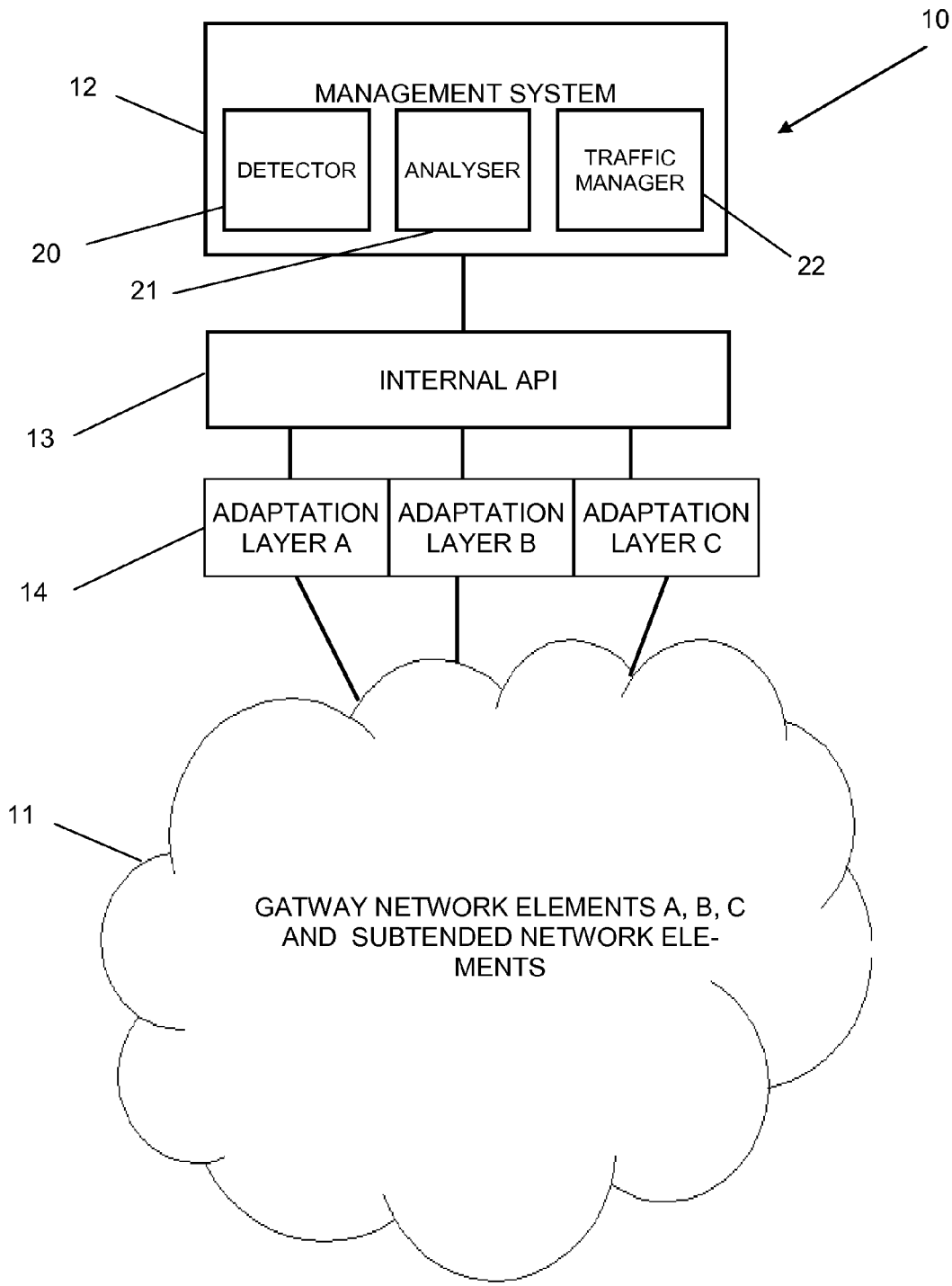
FIG. 1 is an architectural view of a Data Communications Network in accordance with the second aspect of present invention.
Figure 2:
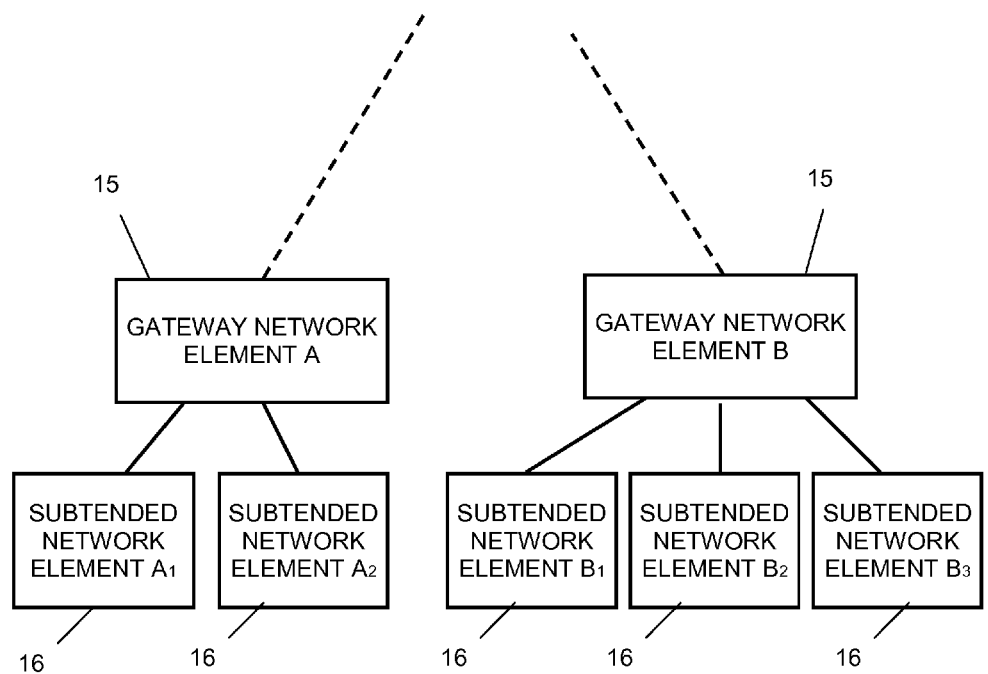
FIG. 2 is a schematic illustration of a possible configuration of Gateway Network Elements and Subtended Network Elements of the network of FIG. 1.

With reference to FIGS. 1 and 2 of the drawings, there is provided a telecommunications network 10 arranged for prioritising traffic within an IP protocol. The network 10 comprises a plurality of Network Elements 11 connected to a management system 12 via an internal Application Programming Interface (API) 13 and a series of adaptation layers 14.

The management system 12 comprises a detection system 20 for detecting an activity belonging to a pre-defined group of high priority activities, an analyser 21 for identifying the specific Network Elements associated with said high priority activity, and a traffic manager 22 for prioritising traffic from these Network Elements. It is envisaged that the detection system 20 and analyser 21 are located within the Network Management System (NMS) 17 of the management system 12, whilst the traffic manager 22 may operate as part of both the NMS 17 and the Element Management System (EMS) 18) of the management system 12.

The management system 12 is adapted for running Operational Support System (OSS) applications including, but not limited to: maintaining a network inventory, configuring network components, and managing faults. The management system 12 includes a Management Information Base (MIB) (not shown) for managing components of the network 10. In addition to conventional MIB fields, the present invention requires the additional fields of:

Default DCSP: the DSCP value assigned to data packets originating from of a Network Element 11 when the Network Element 11 not assigned high priority status;

Timeout value: a value specifying the time period in which to restore the default priority to the Network Element 11. This field is preferable but may be omitted for certain embodiments of the invention, as discussed below.

The network 10 is arranged in a hierarchical structure with one or more Gateway Network Elements (Gateway NEs) 15, each Gateway NE 15 being arranged for subtending Network Elements 16 at a lower hierarchical level than itself. A part of a hierarchical network 10 is schematically illustrated in FIG. 2. In such an arrangement, the network 10 comprises an adaptation layer 14 for each Gateway NE 15. The embodiment illustrated in FIG. 1 comprises three Gateway NEs (A, B, C) 15 and hence three adaptation layers (A, B, C) 14. It will be appreciated that the network 10 may alternatively comprise an adaptation layer for each Network Element 11.

The Network Elements 11 may be connected via embedded channels inside the traffic lines such as Synchronous Transmission Module-n (STM-n) for Synchronous Digital Hierarchy (SDH) or optical channels for Dense Wavelength Divisional Multiplexing (DWDM). These embedded channels are called, depending from the kind of frame overhead they use, Data Communications Channels (DCCs), Optical Supervisory Channels (OSCs), General Communications Channels (GCCs), and others. To realize an end to end connection between the OSS applications and managed Network Elements 11, an out of band DCN is additionally deployed as based on dedicated high performance routers interconnected by high-bandwidth links.

Figure 3:
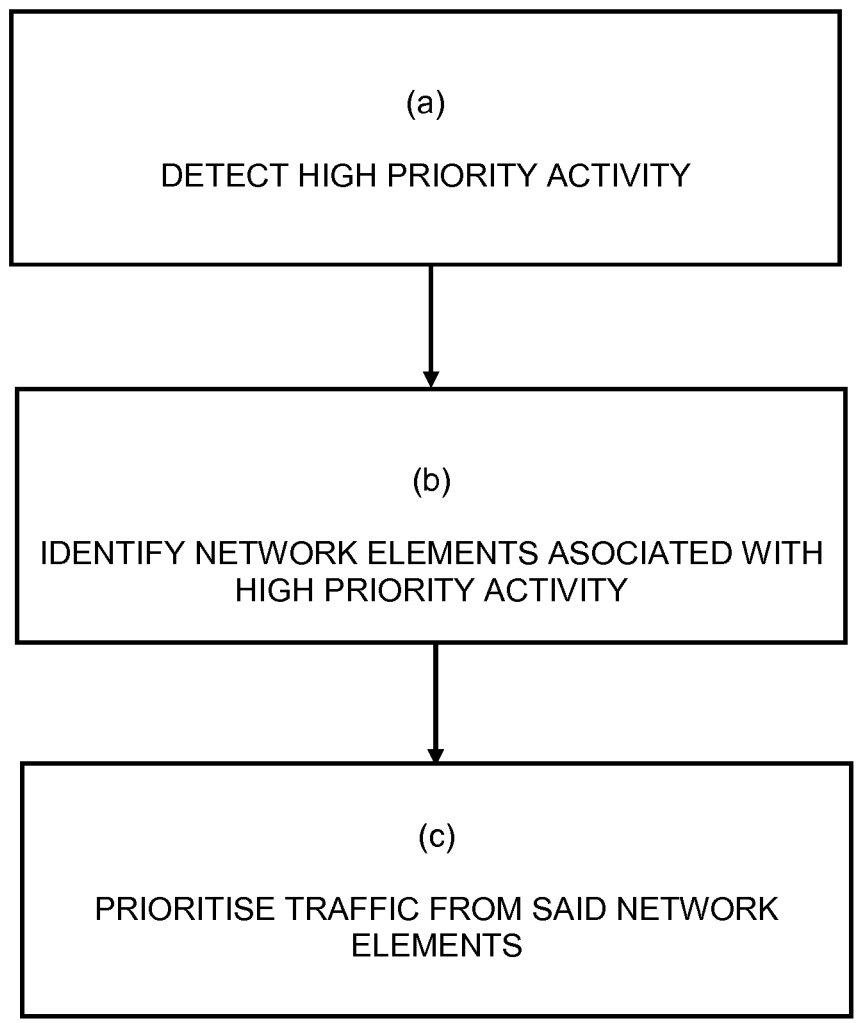
FIG. 3 is a flow diagram illustrating a method in accordance with the first aspect of the present invention; and, FIG. 4 is a sequence diagram illustrating a preferred embodiment of the method of FIG. 3.
Figure 4:
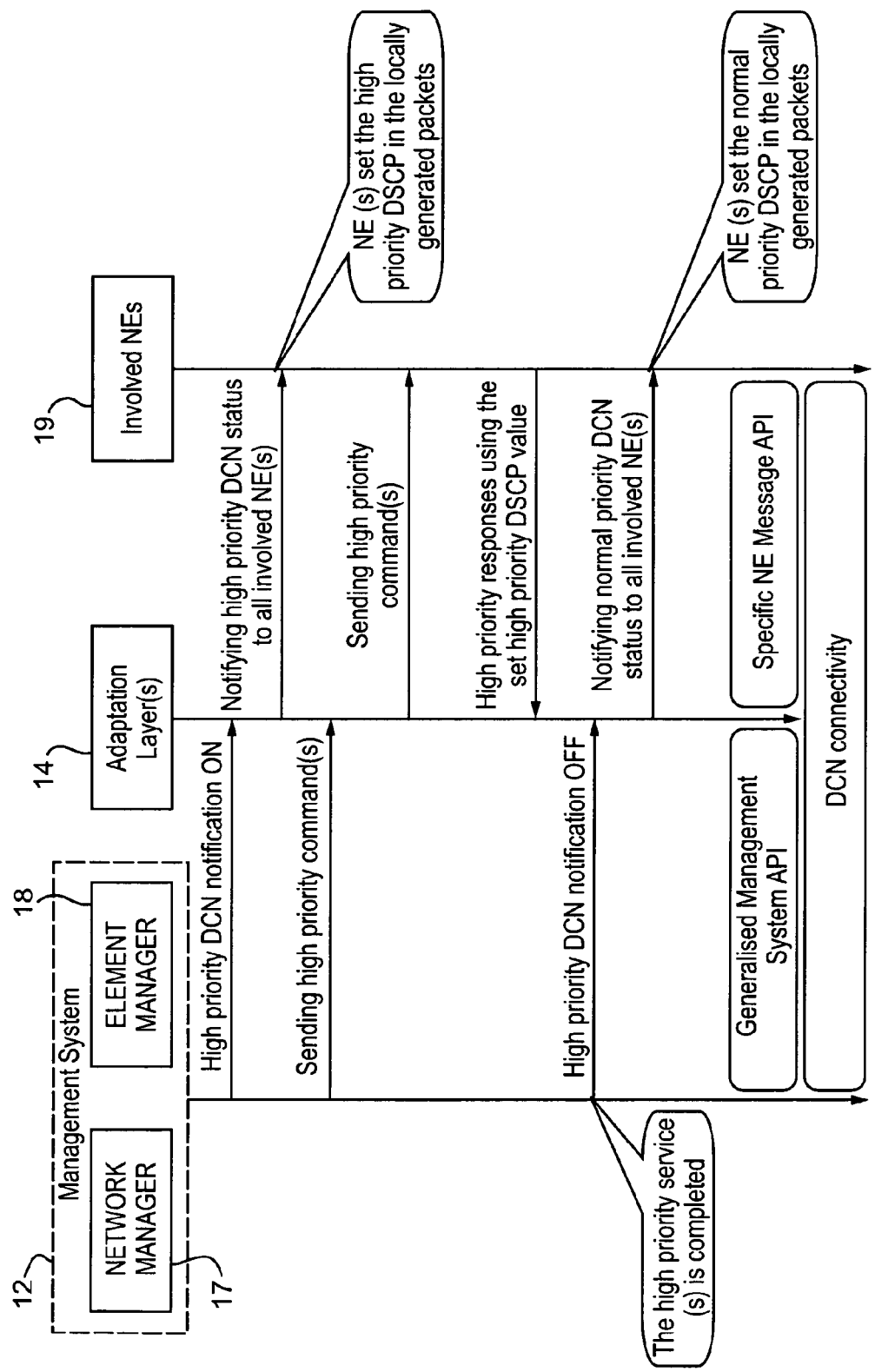

With reference to FIGS. 3 and 4 of the drawings, the detector 20 of the management system 12 is arranged for detecting an activity belonging to a pre-defined group of high priority activities in step (a). The detector 20 of the management system 12 monitors the network 10 and initiates step (b) prior to initiation of an activity belonging the group of high priority activities or upon detection thereof. The group of high priority activities may be pre-programmed in the management system 12 or may be programmed into the management system 12 by a user prior to step (a). It is anticipated that the group of high priority activities includes activities that are crucial to the operation of the network 10 from the perspective of the management system 12 i.e. activities relating to the management of the network 10. By way of example, the group of high priority activities may include:

Protection switch—for those technologies where the protection switch is done by the management system 12 (e.g. restoration on-the-fly);

NE realignment—performed at the start-up of the NEs 15 or in case of changes in the parameters; often a massive flow of data is required while the management of the NE is temporarily misaligned;

NMS Operator's driven activities on critical nodes from a business perspective.

The applicants have recognised that not all management activities are of equal importance for the operation of the network 10 from the perspective of the management system 12. Examples of less important functions include, but are not limited to:

Scheduled NE back-ups;

Performance collections.

Accordingly, the group of high priority activities may include only certain management activities, or may consist of a number of sub-groups, each with different levels of priority.

In step (b), the analyser 21 of the management system 12 is arranged for identifying Network Elements associated with the high priority activity. These Network Elements will herein be described as "involved Network Elements 19". It will be appreciated that once the detector 20 has detected the activity and the analyser 21 has identified this activity, the involved Network Elements 19 will be implicit. For example, if the high priority activity is a full realignment at node link up then the involved Network Element 19 is the linked-up node itself. In another example, if the high priority activity is a cross connection realignment then the involved Network Elements 19 are those involved in the cross-connection. In the latter example, it will be appreciated that the management system 12 will be aware of the nodes involved in the cross-connection.

Once the involved Network Elements 19 have been identified, the traffic manager 22 of the management system 11 prioritises traffic from these Network Elements 19 in step (c). In detail, the involved Network Elements 19 are notified of the high priority status by the traffic manager 22 of the management system 12. It is envisaged that this is carried out via the EMS 18. Once an involved Network Element 19 is notified of high priority status, the DSCP value assigned to data packets originating from an involved Network Element 19 whilst in the default priority state (i.e. prior to modification to the high priority DSCP value) is recorded as the default DSCP. Once this default DSCP has been recorded, any data packets subsequently generated by this Network Element 19 are assigned a DSCP value corresponding to a high priority. Since the present invention prioritises traffic from certain Network Elements 19 relative to others, it is particularly advantageous when applied in relation to high priority activities that need to communicate with a small number of Network Elements 11 in order to obtain a large amount of data.

A time-out value is assigned to each of the involved Network Elements 19, the time-out value being stored in the MIB (not shown) as discussed above. The time that has elapsed since the notification of high priority status is monitored, and default priority is restored to an involved Network Element 19 once the time that has elapsed equals the time-out value assigned to the involved Network Element 19. In addition, a notification is sent from the traffic manager 22 of the management system 12 to the involved Network Elements 19 upon completion of the high priority activity, this notification serving to restore the default priority to the involved Network Elements 19. It will be appreciated that the time-out function serves to restore default priority to the involved Network Elements 19 in the event that the notification from the management system 12 is not received within the expected time frame. Once an involved Network Elements 19 have been restored to a state of default priority then the DSCP value assigned to data packets originating from the involved Network Element 19 is the above-mentioned default DSCP.

It will be appreciated that the high priority status of the involved Network Elements 19 is temporary: packets originating from the involved Network Elements 19 are assigned a high priority DSCP value until default priority is restored, whereupon the packets are assigned a DSCP value corresponding to default priority. Default priority may either be restored by the management system 12 upon completion of the high priority activity, or after the time that has elapsed since the notification of high priority status is equal to the time-out value. The present invention therefore allows a dynamic and application driven modification of DSCP value.

It will further be appreciated that the management system 12 may initiate or detect another high priority activity after completion of the first high priority activity. This second high priority activity may involve the same Network Elements 19 or different Network Elements, but the above-described procedure applies. Furthermore, the management system 12 may initiate or detect another high priority activity before completion of the first high priority activity. In this case, any Network Element 19 involved in any of the concurrent high priority activities is assigned high priority.

From the foregoing therefore, it is evident that the present invention provides a effective means of prioritising certain traffic within the IP protocol of a telecommunications network.

The invention claimed is:

1. A method for prioritising traffic within a data communications network, the data communications network including a management system and a plurality of network elements, the method being implemented within an IP protocol of the data communications network and comprising:
   detecting a high priority activity, said high priority activity being defined as an activity belonging to a pre-defined group of high priority activities, wherein detecting a high priority activity comprises detecting when the management system is preparing to commence or is undertaking an activity belonging to said pre-defined group of high priority activities, and wherein the high priority activities are a subset of activities that relate to management of network elements in the data communications network, wherein the high priority activities include at least one of protection switch, network element realignment, configuration of network elements selected by an operator of the data communications network;
   identifying network elements associated with said high priority activity;
   in response to detecting the high priority activity, prioritising traffic received from said network elements associated with said high priority activity, wherein prioritising traffic received from said network elements includes:
      assigning to each one of said network elements an associated pre-set time period, and
      storing for each one of said network elements the associated pre-set time period in a field of a Management Information Base (MIB), wherein the MIB is used for managing the network elements of the data communications network;
   monitoring a time that elapses since the high priority traffic is prioritized; and
   restoring a default priority to traffic received from said network elements, which relates to management of network elements in the data communication networks, upon at least one of: completion of said high priority activity and a determination that the time that elapses since the traffic from said network elements is prioritized is greater than the pre-set time period.

2. A method according to claim 1, wherein said group of high priority activities is pre-programmed into the management system.

3. A method according to claim 1, wherein said group of high priority activities is configurable by a user.

4. A method according to claim 1, wherein detecting the high priority activity includes receiving a signal from the management system, said signal serving to indicate that the management system is preparing to commence the activity belonging to said pre-defined group of high priority activities.

5. A method according to claim 1, wherein detecting the activity belonging to said pre-defined group of high priority activities includes monitoring the management system for an indication that the management system is preparing to commence the activity belonging to said pre-defined group of high priority activities.

6. A method according to claim 1, wherein detecting the high priority activity includes monitoring the management system for an indication that the management system is undertaking the activity belonging to said pre-defined group of high priority activities.

7. A method according to claim 1, wherein prioritising traffic received from said network elements associated with said high priority activity includes assigning a high priority tag to data packets transmitted from said network elements.

8. A method according to claim 7, wherein said high priority tag is a Differentiated Services Code Point (DSCP) value corresponding to a high priority.

9. A method according to claim 1, wherein said pre-set time period is pre-programmed into the management system.

10. A method according to claim 1, wherein said pre-set time period is configurable by a user.

11. A method according to claim 1, wherein the method further comprises recording a default DSCP value for each network element associated with said high priority activity, said default DSCP value being defined as a DSCP value of said network element prior to detection of said high priority activity, and wherein restoring the default priority to traffic received from said network elements associated with said high priority activity includes assigning said default DSCP value to packets transmitted from said network element.

12. A management system for prioritising traffic within an IP protocol of a data communications network, the data communications network including network elements, the management system comprising:
  a detector_circuit to detect a high priority activity, said high priority activity being defined as an activity belonging to a pre-defined group of high priority activities, wherein to detect a high priority activity comprises to detect when the management system is preparing to commence or is undertaking an activity belonging to said pre-defined group of high priority activities, and wherein the high priority activities are a subset of activities that relate to management of network elements in the data communications network, wherein the high priority activities include at least one of protection switch, network element realignment, configuration of network elements selected by an operator of the data communications network;
  an analyser circuit to identify network elements associated with said high priority activity that relates to management of the identified network elements; and,
  a traffic manager circuit:
    to prioritise traffic received from said network elements associated with said high priority activity in response to detection of the high priority activity, wherein to prioritise traffic received from said network elements includes:
  to assign to each one of said network elements an associated pre-set time period, and
    to store for each one of said network elements the associated pre-set time period in a field of a Management Information Base (MIB), wherein the MIB is used for managing the network elements of the data communications network;
    to monitor a time that elapses since the high priority traffic is prioritized, and
    to restore a default priority to traffic received from said network elements, which relates to management of network elements in the data communication networks, upon at least one of: completion of said high priority activity and a determination that the time that elapses since the traffic from said network elements is prioritized is greater than the pre-set time period.

13. A management system according to claim 12, wherein the detector circuit is arranged to detect when the management system is preparing to commence an activity belonging to said pre-defined group of high priority activities.

14. A management system according to claim 12, wherein the detector circuit is arranged to detect when the management system is undertaking an activity belonging to said pre-defined group of high priority activities.

15. A management system according to claim 12, wherein said group of high priority activities is pre-programmed into the management system.

16. A management system according to claim 12, wherein said group of high priority activities is configurable by a user.

17. A management system according to claim 12, wherein the traffic manager circuit is arranged to assign a high priority tag to packets transmitted from said network elements associated with said high priority activity.

18. A management system according to claim 17, wherein said high priority tag includes a Differentiated Services Code Point (DSCP) value corresponding to a high priority.

19. A management system according to claim 12, wherein the traffic manager circuit is arranged to:
  record a default DSCP value for each network element associated with said high priority activity, said default DSCP value being defined as a DSCP value of said network element prior to detection of said high priority activity; and,
  assign said default DSCP value to packets transmitted from said network element upon at least one of: completion of said high priority activity and expiry of said pre-set time period.

20. A management system according to claim 12, wherein the management system is implemented on a single node.

21. A data communications network arranged for prioritising traffic within an IP protocol thereof, the data communications network comprising:
  network elements; and
  a management system, wherein the management system includes:
    a detector circuit to detect a high priority activity, said high priority activity being defined as an activity belonging to a pre-defined group of high priority activities, wherein to detect a high priority activity comprises to detect when the management system is preparing to commence or is undertaking an activity belonging to said pre-defined group of high priority activities, and wherein the high priority activities are a subset of activities that relate to management of network elements in the data communications network, wherein the high priority activities include at least one of protection switch, network element realignment, configuration of network elements selected by an operator of the data communications network;

an analyser circuit to identify network elements associated with said high priority activity that relates to management of the identified network elements; and a traffic manager circuit:
  to prioritise traffic received from said network elements associated with said high priority activity in response to detection of the high priority activity, wherein to prioritise traffic received from said network elements includes:
    to assign to each one of said network elements an associated pre-set time period, and
    to store for each one of said network elements the associated pre-set time period in a field of a Management Information Base (MIB), wherein the MIB is used for managing the network elements of the data communications network;
  to monitor a time that elapses since the high priority traffic is prioritized, and
  to restore a default priority to traffic received from said network elements, which relates to management of network elements in the data communication networks, upon at least one of: completion of said high priority activity and a determination that the time that elapses since the traffic from said network elements is prioritized is greater than the pre-set time period.

* * * * *